(12) United States Patent
Yang et al.

(10) Patent No.: US 8,238,307 B2
(45) Date of Patent: Aug. 7, 2012

(54) METHOD AND DEVICE FOR CANCELING THE INTERFERENCE AMONG SIGNALS RECEIVED BY MULTIPLE MOBILE STATIONS

(75) Inventors: Hongwei Yang, Shanghai (CN); Liyu Cai, Shanghai (CN); Keying Wu, Shanghai (CN); Dong Li, Shanghai (CN)

(73) Assignee: Alcatel Lucent, Paris (FR)

( * ) Notice: Subject to any disclaimer, the term of this patent is extended or adjusted under 35 U.S.C. 154(b) by 246 days.

(21) Appl. No.: 12/674,092

(22) PCT Filed: Aug. 13, 2008

(86) PCT No.: PCT/CN2008/001458
§ 371 (c)(1),
(2), (4) Date: Feb. 18, 2010

(87) PCT Pub. No.: WO2009/024021
PCT Pub. Date: Feb. 26, 2009

(65) Prior Publication Data
US 2011/0063989 A1    Mar. 17, 2011

(30) Foreign Application Priority Data
Aug. 19, 2007   (CN) .......................... 2007 1 0045034

(51) Int. Cl.
*H04W 4/00* (2009.01)
*H04W 36/00* (2009.01)
*H04J 1/00* (2006.01)

(52) U.S. Cl. ......................... 370/331; 455/442; 370/343

(58) Field of Classification Search ........................ None
See application file for complete search history.

(56) References Cited

U.S. PATENT DOCUMENTS

2005/0265222 A1* 12/2005 Gerlach .......................... 370/208
2007/0248172 A1* 10/2007 Mehta et al. .................. 375/260

FOREIGN PATENT DOCUMENTS

| CN | 1734972 A | 2/2006 |
| CN | 1838556 A | 9/2006 |
| CN | 1870458 A | 11/2006 |

OTHER PUBLICATIONS

Jing et al., "Downlink Macro-Diversity in Cellular Networks" Information Theory, 2007. ISIT 2007. IEEE International Symposium on Issue Date: Jun. 24-29, 2007 on pp. 1-5.*
Zhang et al., "Base station cooperation for multiuser MIMO:: Joint transmission and BS selection" Conference on Information Sciences and Systems (CISS), The Johns Hopkins University, Baltimore, MD, Mar. 2005 retrieved from http://www4.ncsu.edu/~hdai/CISS_hzhang.pdf.*
International Search Report.

* cited by examiner

*Primary Examiner* — Xavier S. Wong
(74) *Attorney, Agent, or Firm* — Fay Sharpe LLP

(57) ABSTRACT

A Macro-Diversity HandOver (MDHO) solution based on multi-User MIMO is provided. Multiple base stations (BSs) serve the MDHO zone. By jointly precoding the modulated signals to be sent, the multiple BSs send the precoded signals to the multiple mobile stations (MSs) over the same time-frequency resources. The signal to be sent is transmitted to the multiple MSs in the MDHO zone. Due to the adoption of the precoding technique, each MS makes no or small interference to other MSs. Since the multiple BSs that serve one MDHO zone serve multiple MSs over the same time-frequency resources, the system capacity in the MDHO zone is greatly improved.

6 Claims, 7 Drawing Sheets

METHOD AND DEVICE FOR CANCELING THE INTERFERENCE AMONG SIGNALS RECEIVED BY MULTIPLE MOBILE STATIONS

FIELD OF THE INVENTION

The invention relates to base stations and mobile stations in wireless telecommunication networks, and particular to methods and devices in the base stations and mobile stations for canceling the interference among signals received by multiple mobile stations in the Macro-Diversity HandOver zone.

BACKGROUND OF THE INVENTION

As an evolutionary standard of IEEE802.16e, IEEE 802.16m targets for doubling average user throughput, cell edge user throughput compared to IEEE802.16e in downlinks (DLs). These targets are very challenging to reach due to severe inter-cell interference at low frequency reuse scenarios. New techniques are highly desirable to achieve these goals.

Multi-User MIMO (MU-MIMO) is a Space Division Multiplexing Access (SDMA) technique efficient for capacity enhancement, with a single Base Station (BS) transmitting multiple data streams to multiple mobile stations (or users) over the same time-frequency resources through precoding techniques. Thanks for the precoding techniques, each mobile station makes no or small interference to other users.

Macro-Diversity HandOver (MDHO) technique based on Single User MIMO (SU-MIMO) scheme has been standardized in IEEE 802.16e. In this technique, when a mobile station locates in one MDHO zone, multiple base stations which serve this MDHO zone send same downlink signals to the mobile station over the same time-frequency resource. The system capacity in the MDHO zone is quite low due to that the multiple base stations use the same time-frequency resource to serve only one same mobile station.

SUMMARY OF THE INVENTION

It would be advantageous to propose a method of Macro-Diversity HandOver based on MU-MIMO. Multiple BSs that serve a MDHO zone jointly precode the modulated signals to be sent to multiple MSs in the MDHO zone, and then send the precoded signals to the multiple MSs over the same time-frequency resources. With the adoption of the precoding technique, each user in the MDHO zone makes no or small interference to other users.

According to a first aspect of the present invention, there is provided a method, in a controlling device in wireless telecommunication networks, of controlling the cancellation of the interference among received signals of multiple mobile stations in a macro-diversity handover zone dominated by the controlling device, comprising: a. obtaining channel related information of the downlinks between multiple mobile stations in said macro-diversity handover zone and multiple base stations that serve said macro-diversity handover zone; c. determining precoding coefficients of said multiple base stations based on said channel related information and a predetermined rule, said precoding coefficients configured to be used by said multiple base stations to precode the multi-streams modulated signals to be sent jointly by said multiple base stations to said multiple mobile stations over same time-frequency resources, so as to cancel interference among received signals of said multiple mobile stations; d. informing each base station of its corresponding precoding coefficients.

According to a second aspect of the present invention, there is provided a method, in a base station in wireless telecommunication networks, of canceling the interference among received signals of multiple mobile stations in a macro-diversity handover zone served by said base station, comprising:— obtaining precoding coefficients determined by a controlling device dominating said macro-diversity handover zone for said base station;—precoding, modulated signals to be sent jointly by said base station and other multiple base stations that serve said macro-diversity handover zone over same time frequency resources to multiple mobile stations in said macro-diversity handover zone based on said precoding coefficients, so as to obtain precoded signals to be sent;—sending said precoded signals to said multiple mobile stations.

According to a third aspect of the present invention, there is provided a method, in a mobile station in wireless telecommunication networks, of aiding the cancellation of interference among the received signals of said mobile station and that of other at least one mobile station in a macro-diversity handover zone when said mobile station is located in said macro-diversity handover zone, comprising: ii. measuring channel related information of downlinks between said mobile station and multiple base stations that serve said macro-diversity handover zone; iii. sending channel related information of the downlinks between said mobile station and multiple base stations that serve said macro-diversity handover zone to a corresponding network device.

According to a fourth aspect of the present invention, there is provided a controlling device, in wireless telecommunication networks, for controlling the cancellation of the interference among received signals of multiple mobile stations in a macro-diversity handover zone dominated by the controlling device, comprising:
a first obtaining means configured to obtain channel related information of downlinks between multiple mobile stations in said macro-diversity handover zone and multiple base stations that serve said macro-diversity handover zone;
a first determining means configured to determine precoding coefficients of said multiple base stations based on said channel related information and a predetermined rule, said precoding coefficients configured to be used by said multiple base stations to precode the multi-stream modulated signals to be sent jointly by said multiple base stations to said multiple mobile stations over same time-frequency resources, so as to cancel interference among received signals of said multiple mobile stations;
a first informing means configured to inform each of base station of its corresponding precoding coefficients.

According to a fifth aspect of the present invention, there is provided an interference cancellation device, in a base station in wireless telecommunication networks, for canceling the interference among received signals of multiple mobile stations in a macro-diversity handover zone served by said base station, comprising: a third obtaining means configured to obtain precoding coefficients determined by a controlling device dominating said macro-diversity handover zone for said base station; a precoding means configured to precode modulated signals to be sent jointly by said base station and other multiple base stations that serve said macro-diversity handover zone over same time frequency resources to multiple mobile stations in said macro-diversity handover zone based on said precoding coefficients, so as to obtain precoded signals to be sent; a second sending means configured to send said precoded signals to said multiple mobile stations.

According to a sixth aspect of the present invention, there is provided an aiding device, in a mobile station in wireless telecommunication networks, for aiding the cancellation of interference among the received signals of said mobile station and that of other at least one mobile station in a macro-diversity handover zone when said mobile station is located in said macro-diversity handover zone, comprising: a measuring means configured to measure the channel related information of downlinks between said mobile station and multiple base stations that serve said macro-diversity handover zone; a fourth sending means configured to send channel related information of the downlinks between said mobile station and multiple base stations that serve said macro-diversity handover zone to a corresponding network device.

By using the method and device provided by the present invention, the multiple BSs that serve one MDHO zone can serve multiple MSs over the same time-frequency resources, which greatly improves the system capacity of the MDHO zone, and since the multiple BSs adopt joint precoding, each MS cause no or small interference to other MSs.

BRIEF DESCRIPTION OF THE DRAWINGS

Other features, aspects and advantages of the present invention will become obvious by reading the following description of non-limiting embodiments with the aid of appended drawings.

wherein, same or similar reference numerals refer to the same or similar steps or means.

DETAILED DESCRIPTION OF EMBODIMENTS

Figure 1:
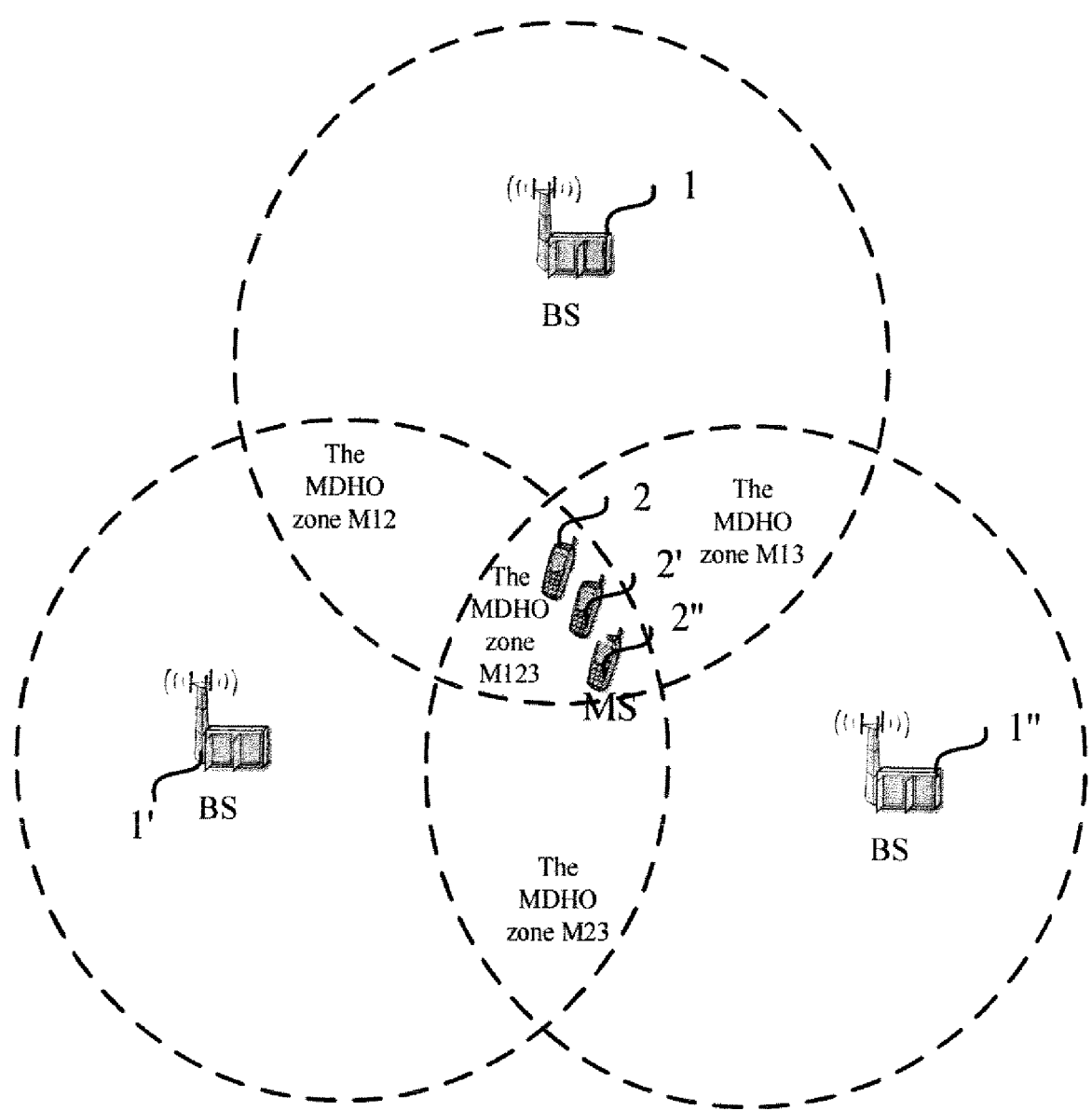
FIG. 1 shows an application scenario of the present invention.

FIG. 1 shows an application scenario of the present invention. In FIG. 1, the overlapped region which is covered by BS 1, BS 1' and BS 1" is the macro-diversity handover zone M123. Besides, the overlapped region which is only covered by BS 1 and BS 1' is the macro-diversity handover zone M12, and the overlapped region which is only covered by BS 1' and BS 1" is the macro-diversity handover zone M23. The meaning of macro-diversity handover zone is that in the traditional handover zone, multiple BSs that can serve the handover zone serve one MS over the same time-frequency resources. For each MDHO zone, the network administrator can select a BS (also called main BS in some paper) from the multiple BSs that serve the MDHO zone to be responsible for determining the precoding coefficients of each BS that can serve the MDHO zone, and for controlling each BS to send signals jointly to multiple MSs in the MDHO zone.

When the MS 2, MS 2' and MS 2" are in the MDHO zone M123, the BS 1, BS 1' and BS 1" can jointly send signals to the MS 2, MS 2' and MS 2" over same time-frequency resources by precoding. The detailed implementing process is as follows.

Suppose that the BS 1 is responsible for determining the precoding coefficients of each BS that can serve the MDHO zone M123, and controlling each BS to send signals jointly to the MS 2, MS 2' and MS 2" in the MDHO zone M123.

The process for the BS 1 to determine whether MS 2 is in the MDHO zone is as follows: when BS 1 detects that the signal strength of the UL signal from MS 2 is lower than a threshold (the specific value of the threshold can differ with respect to the difference of network topology), it sends a measuring instruction to MS 2, and the measuring instruction instructs the MS 2 to measure the channel related information of the DLs between MS 2 and multiple BSs that the MS 2 communicates with (BS 1, BS 1' and BS 1" in FIG. 1), and to send the channel related information to BS 1. After the MS 2 receives the instruction, it measures the channel related information of the DLs between MS 2 and BS 1, BS 1' and BS 1", and sends the channel related information to BS 1. The BS 1 learns that the MS 2 communicates with BS 1, BS 1' and BS 1" currently according to the channel related information fed back by the MS 2, and determines that MS 2 is in the MDHO zone M123. If the BS 1 learns that the MS 2 communicates with BS 1 and BS 1' currently according to the channel related information fed back by the MS 2, it determines that MS 2 is in the MDHO zone M12.

Similarly, when BS 1 detects that the signal strength of the UL signal from MS 2' is lower than a threshold, it sends a measuring instruction to MS 2' to instruct the MS 2' to measure the channel related information of the DLs between MS 2' and multiple BSs (BS 1, BS 1' and BS 1" in FIG. 1) and to send the channel related information to BS 1. The same happens to MS 2".

After the BS 1 obtains the channel related information between the MS 2, MS 2' and MS 2" in the MDHO zone and the BS 1, BS 1' and BS 1" respectively, it computes the precoding coefficients corresponding to each BS, and informs each BS of the corresponding precoding coefficients.

Besides, the BS 1 can also obtain which MDHO zone the MS 2 is in. For example, the MS 2 is close to BS 1' before it moves into the MDHO zone, that is, it communicates with BS 1'. When the MS 2 moves into the MDHO zone M12, the BS 1' learns that the MS satisfies the handover condition (for example, the signal strength of the UL signal received from the MS 2 by the BS 1' is lower than a threshold), and it sends searching instruction to MS 2, to instruct it to search the BS that the MS 2 can communicate with, and to report to the BS V. If the MS 2 is in the MDHO zone M12, it can find the BS 1, and report to the BS 1'. The BS 1' determines that the MS 2 is in the MDHO zone M12 according to the report by MS, and report to BS 1. In a word, there are multiple methods for determining which MDHO zone the MS is in, which is similar to that in the MDHO solution based on single user in the prior art, the details of which are omitted.

It should be noted that, the channel related information includes channel estimating values and signal to noise ratio (SNR), which can be instantaneous channel estimating values and signal to noise ratio, or long term statistical average values of channel estimating values and signal to noise ratio.

Preferably, the BS 1 can select part of the BSs in the multiple BSs that serve the MDHO zone to send signals jointly to each MS in the MDHO zone according to the channel related information between each MS and each BS in the MDHO zone. For example, the amplitude of the channel estimating values of the DLs between the MS 2 and BS 1" is smaller than that between the MS 2 and BS 1 or BS 1', or the SNR of the DL signal received by MS 2 from BS 1" is lower than that of the DL signal received by MS 2 from BS 1 or BS F. Similarly, the amplitude of the channel estimating values of the DLs between the MS 2' and BS 1" is smaller than that between the MS 2' and BS 1 or BS 1', or the SNR of the DL signal received by MS 2' from BS 1" is lower than that of the DL signal received by MS 2' from BS 1 or BS 1'; the amplitude of the channel estimating values of the DLs between the MS 2" and BS 1" is smaller than that between the MS 2" and BS 1 or BS 1', or the SNR of the DL signal received by MS 2" from BS 1" is lower than that of the DL signal received by MS 2" from BS 1 or BS 1'.

Then the BS 1 selects the BS 1 and BS 1' to send signals jointly to MS 2, MS 2' and MS 2". The BS 1 determines the precoding coefficients of BS 1 and BS 1' according to the channel related information between BS 1, BS 1' and MS 2, MS 2' and MS 2", and informs the precoding coefficients of BS 1' to BS 1'.

Taking the case that BS 1 and BS 1' send signals jointly to MS 2, MS 2' and MS 2" with minimum mean-square error (MMSE) rule as an example to elucidate the determining process of the precoding coefficients, wherein each of BS 1 and BS 1' has four transmitting antennas, and each of MS 2, MS 2' and MS 2" has one receiving antenna. Therefore, the overall channel transmitting matrix between the BS 1, BS 1' and MS 2, MS 2' and MS 2" is given by the following equation (1):

$$H = \begin{bmatrix} H_{11} & H_{12} \\ H_{21} & H_{22} \\ H_{31} & H_{32} \end{bmatrix} \quad (1)$$

wherein, $H_{11}$, $H_{12}$ represent the channel transmitting matrix between MS 2 and BS 1, MS 2 and BS 1' respectively; $H_{21}$, $H_{22}$ represent the channel transmitting matrix between MS 2' and BS 1, MS 2' and BS 1' respectively; $H_{31}$, $H_{32}$ represent the channel transmitting matrix between MS 2" and BS 1, MS 2" and BS 1' respectively. Since each of BS 1 and BS 1' has four transmitting antennas, and each of MS 2, MS 2' and MS 2" has one receiving antenna, $H_{ji}$ (i=1,2; j=1,2,3) is 1×4 complex matrix and is composed of four channel estimating values.

According to the MMSE rule of the multi-user MIMO (MU-MIMO), the precoding matrix is denoted as follows:

$$W = \left( H^H H + \frac{1}{SNR} I_{8\times 8} \right)^{-1} H^H \quad (2)$$

wherein, H represents the overall channel transmitting matrix between the BS 1, BS 1' and MS 2, MS 2' and MS 2", as illustrated in formula (1), SNR is the average values of the SNR of the DL signals received by MS 2, MS 2' and MS 2" from BS 1 and BS 1', the average values can be the average values of the instantaneous SNR, or can be the average values of long term statistical average SNR.

W is a 8×3 complex matrix, wherein, $W_1$=(1:4,:) (the first to fourth row of W) is the precoding coefficients of BS 1, $W_2$=W(5:8,:) (the fifth to eighth row of W) is the precoding coefficients of BS 1'.

Figure 2:
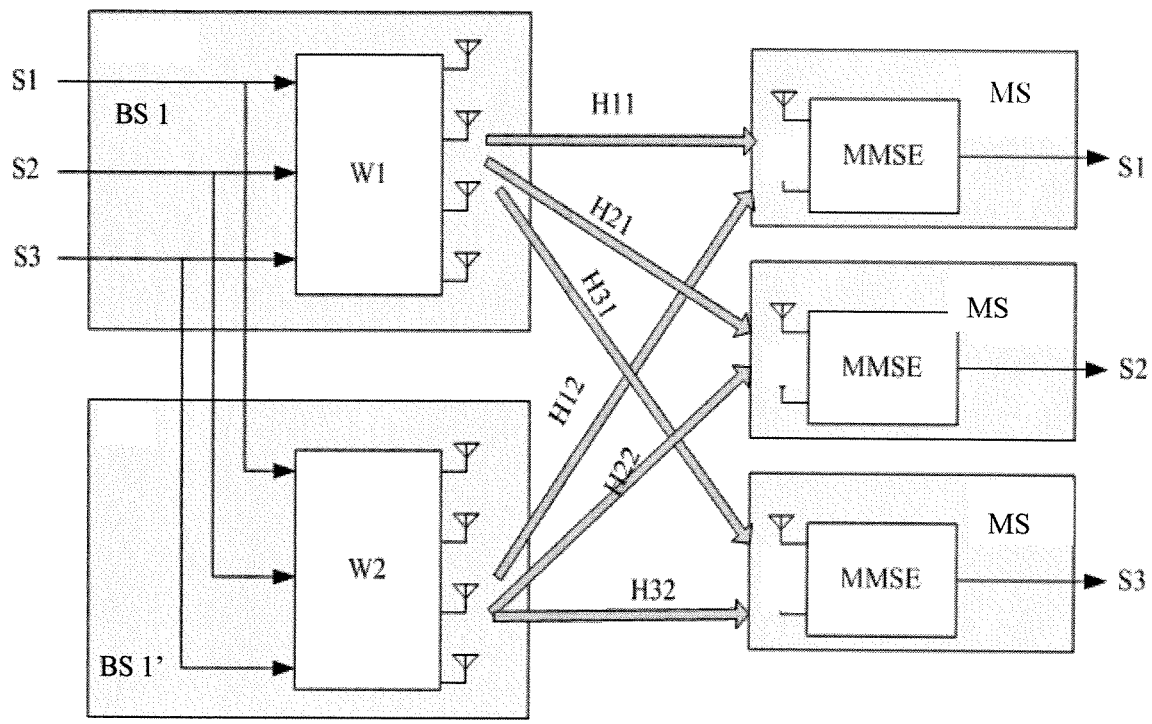
FIG. 2 shows a systematic model diagram according to an embodiment of the present invention.

In the systematic model diagram shown in FIG. 2, S1, S2 and S3 are the modulated signals to be sent to MS 2, MS 2' and MS 2" respectively. The BS 1 and BS 1' precoded the modulated signals to be sent $$S = \begin{pmatrix} S_1 \\ S_2 \\ S_3 \end{pmatrix}$$

with W1 and W2:

$$\hat{S} = Wi \cdot S \quad (3)$$

wherein, i=1, 2, and S is a 1×4 vector, each of whose element is sent at the four transmitting antennas of the BS respectively. Then, the BS 1 and BS 1' send the precoded signals jointly over same time-frequency resources to MS 2, MS 2', and MS 2".

The object of precoding is to cancel the interference among the signals received by MS 2, MS 2', and MS 2". After the MS 2, MS 2', and MS 2" receive the above signals, the received signals are decoded based on MMSE rule, and the S1, S2 and S3 are decoded respectively, as shown in FIG. 2.

It should be noted that, the process of determining the precoding coefficients for each BS is described based on the case that two BSs send signals jointly to three MSs, those skilled in the art can deduce the process of determining the precoding coefficients for each BS in other case that multiple BSs communicate with multiple MSs according to the teaching of the present invention.

In addition, it should be noted that, although the case that MMSE rule is applied and each MS has one receiving antenna is taken as an example above for describing the process of determining the precoding coefficients for each BS, those skilled in the art should understand that the present invention is not limited to this, the present invention is also applicable to the situation that other determining rule of precoding coefficients in the MU-MIMO in prior art and MS has multiple receiving antennas, the details of process of determining the precoding coefficients can refer to the precoding matrix of the MU-MIMO in the prior art.

It should also be noted that, if the block diagonalizaiton (BD) of equivalent channel matrix rule is used, only the channel transmitting matrix of the DL between each BS and each MS is needed, and there is no need to know the SNR of the DL signals. If the successive MMSE (SMMSE) is used to determine the precoding coefficients of each BS, then similar to MMSE rule, the channel transmitting matrix of the DL between each BS and each MS and the SNR of the DL signals are needed. The detailed process of determining the precoding coefficients using the existing rules for determining the precoding coefficients of MU-MIMO can be found in "Zero-forcing methods for downlinks spatial multiplexing in multi-user MIMO channels," Q. H. Spencer, A. L. Swindlehurst and M. Haardt, IEEE. Transactions on Signal Processing, vol. 52, no. 2, pp. 461-471, February 2004", the details of which are omitted here.

Besides, the BS 1 can select those BSs that jointly send signals to each MS based on the signal strength of the UL signal received by each BS in the MDHO zone from each MS. To be specific, the BS 1 informs BS 1' and BS 1" respectively to measure the signal strengths of the UL signals received from MS 2, MS 2' and MS 2", and to feed them back to BS 1; meanwhile, the BS 1 also measures the signal strengths of the UL signals received by itself from MS 2, MS 2' and MS 2". The BS 1 selects those BSs with stronger signal strength of the UL signal received from each MS to jointly send signals to each MS based on the signal strength of the UL signal received by each BS from each MS.

Preferably, the BS 1 can also control the BS 1, BS 1' and BS 1" to send orthogonal pilot symbols on each transmitting antenna to MS 2, MS 2' and MS 2", in order for the MS 2, MS 2' and MS 2" to determine the channel estimating values.

It should be noted that the MS 2, MS 2' and MS 2" can determine the channel estimating values of the DLs based on the non-orthogonal pilot symbols sent by BS 1, BS 1' and BS 1".

It should be noted that the selection rules for selecting part of the BSs in the multiple BSs that serve the MDHO zone to jointly send signals to each MS is not limited to channel related information of the DLs between each BS and each MS or the signal strength information of the UL signal received by each BS from each MS. Other parameters that can denote the channel state, especially the DL channel state, between each BS and each MS can be taken as the selection rule.

Since the number of the BSs that can serve a certain MDHO zone is certain, when the number of the MSs in one MDHO zone is too much and exceeds the number of the MSs that the multiple BSs can serve over one time-frequency resource, the MSs in the MDHO zone are needed to be divided into groups, so that different MS groups can be served over different time-frequency resources. Similarly, the BSs that serve the MDHO zone can also be divided into groups and different BS groups can serve different MS groups. The rules for selecting each BS group and each MS group can be the channel related information or channel strength information as described above or other parameters that can represent the channel state. For example, there are seven MSs in the MDHO zone, and three BSs can serve the MDHO zone. Suppose each BS has four transmitting antenna, then the multiple BSs can serve four MSs over the same time-frequency resources. Suppose the first BS is responsible for the precoding calculation and communication scheduling of each BS. If the channel states of the DL channel between the first to the fourth MS and the first and second BS are better (as described above, determined according to the channel related information or signal strength information or other parameter that represent the channel state), and the channel states of the DL channel between the fifth to the seventh MS and the second and third BS are better, then the first and second BSs are scheduled to jointly send signals with precoding over the first time-frequency resources to the first to the fourth MSs, and the second and third BSs are scheduled to jointly send signals with precoding over the second time-frequency resources to the fifth to the seventh MSs.

Figure 3:
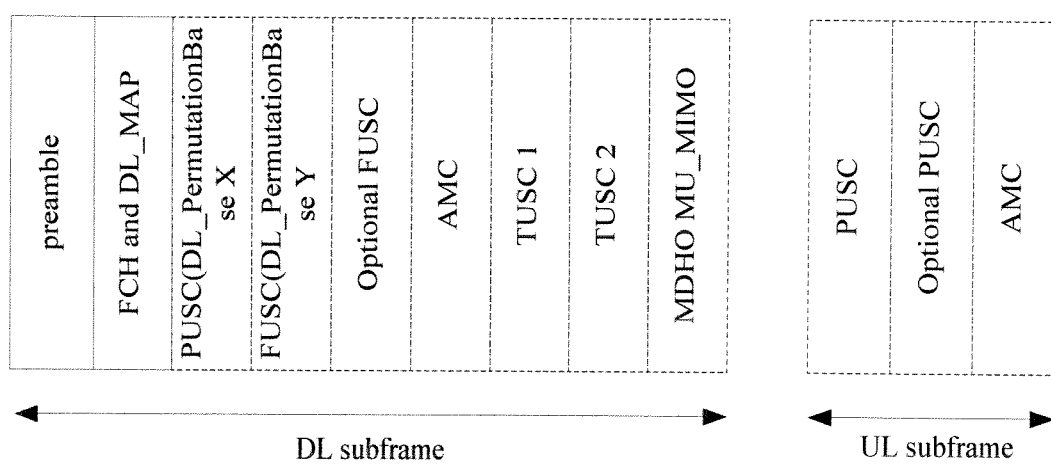
FIG. 3 shows a diagram of the frame structure of the uplink (UL) frame of wireless telecommunication according to an embodiment of the present invention.

When the MDHO scheme based on MU-MIMO proposed by the present invention is implemented in the WiMax wireless telecommunication network, the DL subframe in the frame structure defined in the IEEE802.16 standards can be added with a MDHO MU-MIMO zone, which is dedicatedly used to send precoded DL signals jointly with other BSs to the multiple MSs in the MDHO zone, as shown in FIG. 3. Other fields shown in FIG. 3, such as PUSC, FUSC, whose specific meanings can be referred to IEEE802.16 standards, and are omitted here. Meanwhile, a parameter, MDHO MU-MIMO, should be added in the STC_DL_Zone switch IE ()of the DL_MAP, to indicate whether the MDHO MU-MIMO defined above is used. At the same time, a new Information Element (IE) should be defined to define all kinds of parameters in the MDHO MU-MIMO zone. As shown in Table 2, Table 2 defines an IDcell, which is used to identify the MDHO zone being served, wherein the bit size denoted by X is to be determined for practical application. The physical meanings of other parameters in Table 1 and Table 2 are the same with the existing IEEE802.16 standard, and are omitted here.

It should be noted that, the controlling function to obtain the channel related information between each MS and each BS in the MDHO zone and determine the precoding coefficients for the corresponding BSs, and then to inform the corresponding base stations of their corresponding precoding coefficients can be implemented by a certain BS that serve the MDHO zone, or other network devices, such as the controlling device in Radio Network Controller (RNC) in 3G networks.

TABLE 1

| STC/DL_Zone switch IE ( ) | | |
|---|---|---|
| Syntax | Size(bits) | Notes |
| STC_DL_ZONE_IE( ){ | | |
| ... | | |
| DL_PermBase | X | |
| MDHO MU-MIMO | 1 bit | 0 = Do not use MDHO MU-MIMO |
| | | 1 = Use MDHO MU-MIMO |
| ... | | |
| } | | |

Figure 4:
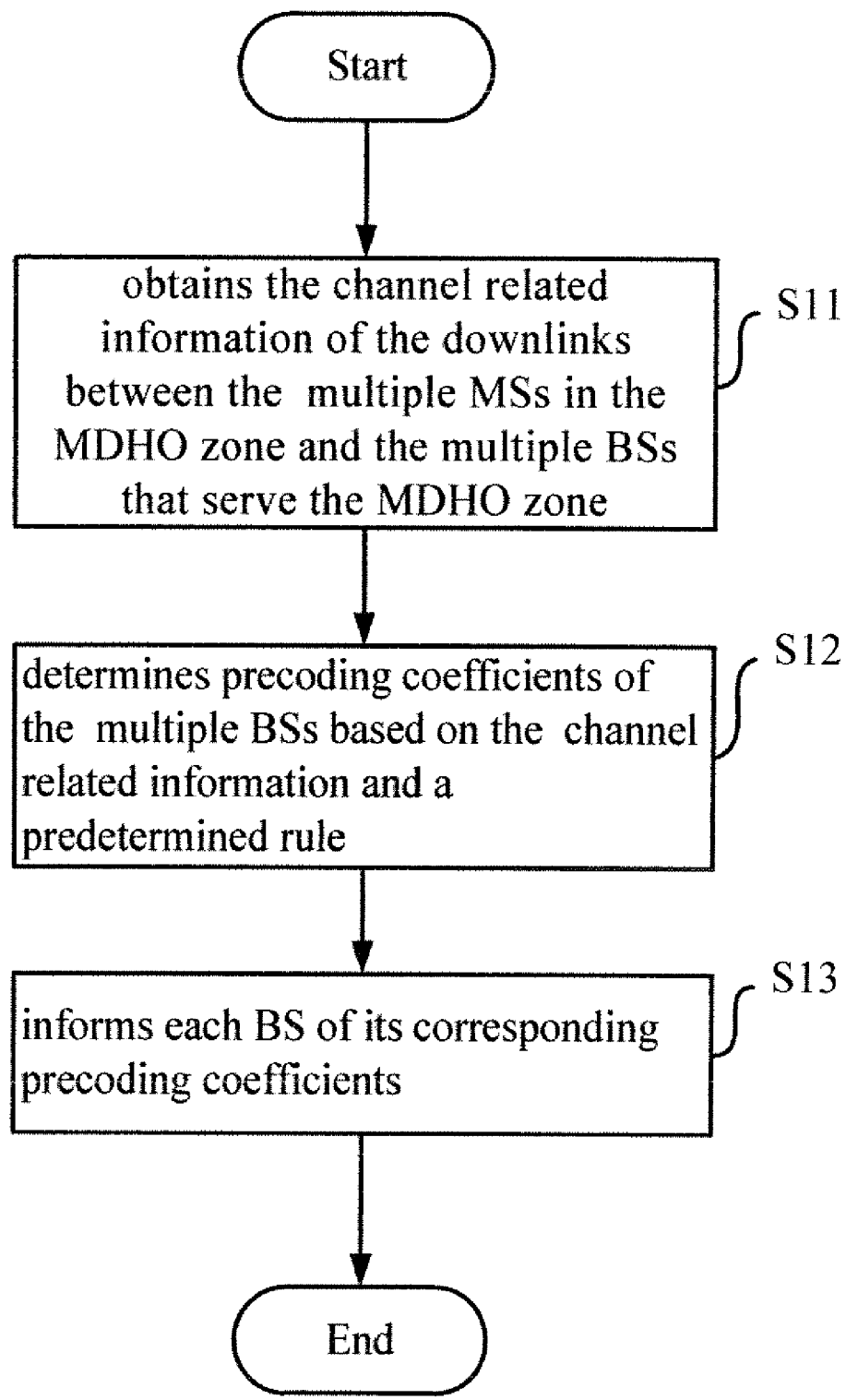
FIG. 4 shows a flowchart, in a controlling device in wireless telecommunication networks, of controlling the cancellation of the interference among received signals of multiple mobile stations in the MDHO zone dominated by the controlling device according to an embodiment of the present invention.

FIG. 4 shows a flowchart, in a controlling device in wireless telecommunication network, of controlling the cancellation of the interference among received signals of multiple mobile stations in the MDHO zone dominated by the controlling device according to an embodiment of the present invention.

Taking the application scenario of FIG. 1 as an example, and referring to FIG. 4, the description of the flowchart in a controlling device, of controlling the cancellation of the interference among received signals of multiple mobile stations in the MDHO zone dominated by the controlling device is given in details. Here, suppose the controlling device is located in BS 1, and the controlling device is responsible for controlling each BS that serves the MDHO zone M123, that is, controlling BS 1, BS 1' and BS 1" to jointly send DL signals to MS 2, MS 2' and MS 2".

First, in step S11, the controlling device obtains the channel related information of the DLs between the MS 2, MS 2' and MS 2" and the BS 1, BS 1' and BS 1" in the MDHO zone M123. The channel related information includes the channel estimating values, or the channel estimating values and SNR.

To be specific, the ways for the controlling device to obtain the channel related information of the DLs between the MS 2, MS 2' and MS 2" and the BS 1, BS 1' and BS 1" are various.

TABLE 2

MDHO_MU_MIMO_DL_Basic_IE( )

| Syntax | Size(bits) | Notes |
| --- | --- | --- |
| MDHO_MU_MIMO_DL_Basic_IE( ) { | | |
| Length | X | The length of MDHO_MU_MIMO_DL_Basic_IE( ), Length in bytes |
| Num_Region | X | |
| IDcell | X | Identifying the MDHO zone being served |
| For (i=0; i<Num_Region;i++){ | | |
|    OFDMA symbol offset | X | |
|    Subchannel_offset | X | |
|    Boosting | X | If antenna selection is used in the MDHO zones, boosting will be used for full power transmission |
|    No. OFDMA symbols | X | |
|    No. Subchannels | X | |
|    Packet index | X | Packet index for each region |
|    CID | X | Indicates a data flow to a Ms in a MDHO |
|    } } | | |

One obtaining way is: the controlling device sends the measuring instruction to MS 2, MS 2' and MS 2" respectively, the measuring instruction is used to instruct each MS to measure the channel related information of the DLs between each MS and multiple BSs and to send the channel related information to the controlling device, and then the controlling device receives the channel related information of the DLs between MS 2, MS 2' and MS 2" and BS 1, BS 1' and BS 1" respectively from MS 2, MS 2' and MS 2"

Another obtaining way is that: the controlling device informs BS 1, BS 1' and BS 1" respectively, and each of BS 1, BS 1' and BS 1" informs each of MS 2, MS 2' and MS 2" of measuring the channel related information and feeding them back to the corresponding BSs, and the BSs send them to the controlling device.

Still another obtaining way is: each of the MS 2, MS 2' and MS 2" actively measures the channel related information between each of the MS 2, MS 2' and MS 2" and BS 1, BS 1' and BS 1", and actively report them to the BS 1, BS 1' and BS 1"; each of the BS 1, BS 1' and BS 1" then actively sends them to the controlling device.

Besides, for the case of symmetry between the UL and DL channel in Time-Division Duplex (TDD) system, the BSs can directly determine the channel estimating values, and send them to the controlling device.

Then, in step S12, the controlling device determines the precoding coefficients of BS 1, BS 1' and BS 1" based on the channel related information and a predetermined rule, and the aim of precoding is to cancel the interference among the received signals of MS 2, MS 2' and MS 2".

Referring to the determining method of the precoding coefficients in the existing MU-MIMO, the precoding coefficients can be determined based on the channel transmitting matrix of the DL channel between each BS and each MS and the BD rule of the equivalent channel matrix, or determined by the channel transmitting matrix of the DL channel between each BS and each MS and the SNR of the DL signal and the MMSE rule or SMMSE rule.

At last, in step S13, the corresponding precoding coefficients of each BS are informed to each BS.

Preferably, the controlling device can select two BSs from the BS 1, BS 1' and BS 1" that serve the MDHO zone M123 to jointly send precoded DL signals to the MS 2, MS 2' and MS 2" over the same time-frequency resources, based on the channel related information.

Preferably, the controlling device, based on the channel related information, can divide the multiple BSs that serve a certain MDHO zone into multiple BS groups and divide the multiple MSs in the MDHO zone into multiple MS groups, wherein, each BS group jointly send DL signals to corresponding one MS group over the same time-frequency resources, each BS group occupies different time-frequency resources.

Besides, the controlling device can select two BSs from the BS 1, BS 1' and BS 1" that serve the MDHO zone M123 to jointly send precoded DL signals to the MS 2, MS 2' and MS 2" over the same time-frequency resources, based on the signal strengths of the UL signals received by the BS 1, BS 1' and BS 1" that serve the MDHO zone M123 from the MS 2, MS 2' and MS 2". To be specific, the controlling device informs the BS 1, BS 1' and BS 1" to detect the signal strengths of the UL signals from the MS 2, MS 2' and MS 2" and report the signal strengths of the UL signals from each MS to the controlling device.

Besides, the controlling device, based on the signal strength of the UL signal received by each BS from each MS, can divide the multiple BSs that serve a certain MDHO zone into multiple BS groups and divide the multiple MSs in the MDHO zone into multiple MS groups, wherein each BS group jointly send DL signals to corresponding one MS group over the same time-frequency resources, each BS group occupies different time-frequency resources.

Preferably, the controlling device controls the BS 1, BS 1' and BS 1" that serve the MDHO zone M123 to send orthogonal pilot symbols at each transmitting antenna to the MS 2, MS 2' and MS 2", in order for the MS 2, MS 2' and MS 2" to determine the channel estimating values conveniently.

It should be noted that, the MS 2, MS 2' and MS 2" can determine the DL channel estimating values based on the non-orthogonal pilot symbols sent by BS 1, BS 1' and BS 1".

Figure 5:
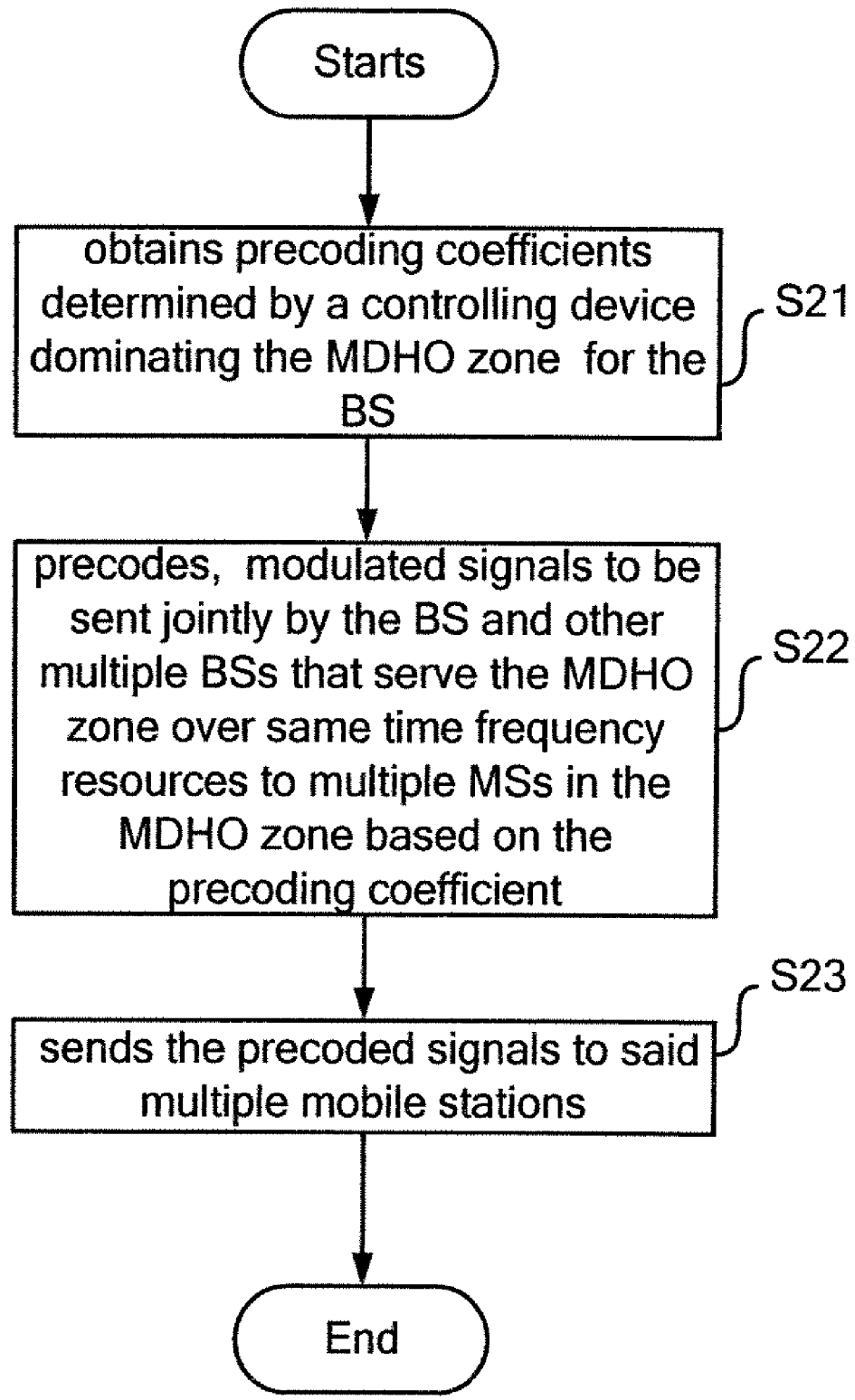
FIG. 5 shows a flowchart, in a BS in wireless telecommunication network, of cancelling the interference among received signals of multiple mobile stations in the MDHO zone served by the BS according to an embodiment of the present invention.

FIG. 5 shows a flowchart, in a BS in wireless telecommunication network, of cancelling the interference among received signals of multiple mobile stations in the MDHO zone served by the BS according to an embodiment of the present invention. Taking the BS 1 in the application scenario shown in FIG. 1 as an example, and referring to FIG. 5, the description of the flowchart in a BS in the present invention, of canceling the interference among received signals of multiple mobile stations in the MDHO zone served by the BS is given in details.

First, in step S21, the BS 1 obtains the precoding coefficients determined by a controlling device dominating said MDHO zone for BS 1.

Then, in step S22, the BS 1 precodes modulated signals to be sent jointly by BS 1, BS 1' and BS 1" over same time frequency resources to MS 2, MS 2' and MS 2" based on the precoding coefficients, so as to obtain precoded signals to be sent.

At last, in step S23, the BS 1 sends the precoded signals to MS 2, MS 2' and MS 2".

Preferably, the BS 1 can obtain the channel related information between itself and MS 2, MS 2' and MS 2"; and send the channel related information to the controlling device. To be specific, taking the case that the BS 1 obtains the channel related information of MS 2 as an example. When the BS 1 receives the notification from the controlling device or detects that the signal strength of the UL signal from the MS 2 is lower than a threshold, it informs MS 2 to estimate the channel related information and send it to the BS 1. Then, the BS 1 sends the received channel related information of MS 2 to the controlling device. Alternatively, the MS 2, MS 2' and MS 2" actively measure the channel related information between themselves and the BS 1, and report actively to the BS 1, and the BS 1 sends them actively to the controlling device.

Besides, for the case of symmetry between the UL and DL channel in Time-Division Duplex (TDD) system, the BS 1 can directly determine the channel estimating values, and send them to the controlling device.

Preferably, the BS 1 can detect the signal strengths of the UL signals received by the BS 1 from the MS 2, MS 2' and MS 2" based on the notification of the controlling device or actively; and inform the signal strengths of the UL signals from the MS 2, MS 2' and MS 2" to the controlling device.

Preferably, the BS 1 sends corresponding pilot symbols to the MS 2, MS 2' and MS 2" according to the orthogonal pilot pattern informed by the controlling device.

It should be noted that the MS 2, MS 2' and MS 2" can determine the channel estimating values of the DLs based on the non-orthogonal pilot symbols sent by BS 1, BS 1' and BS 1".

Figure 6:
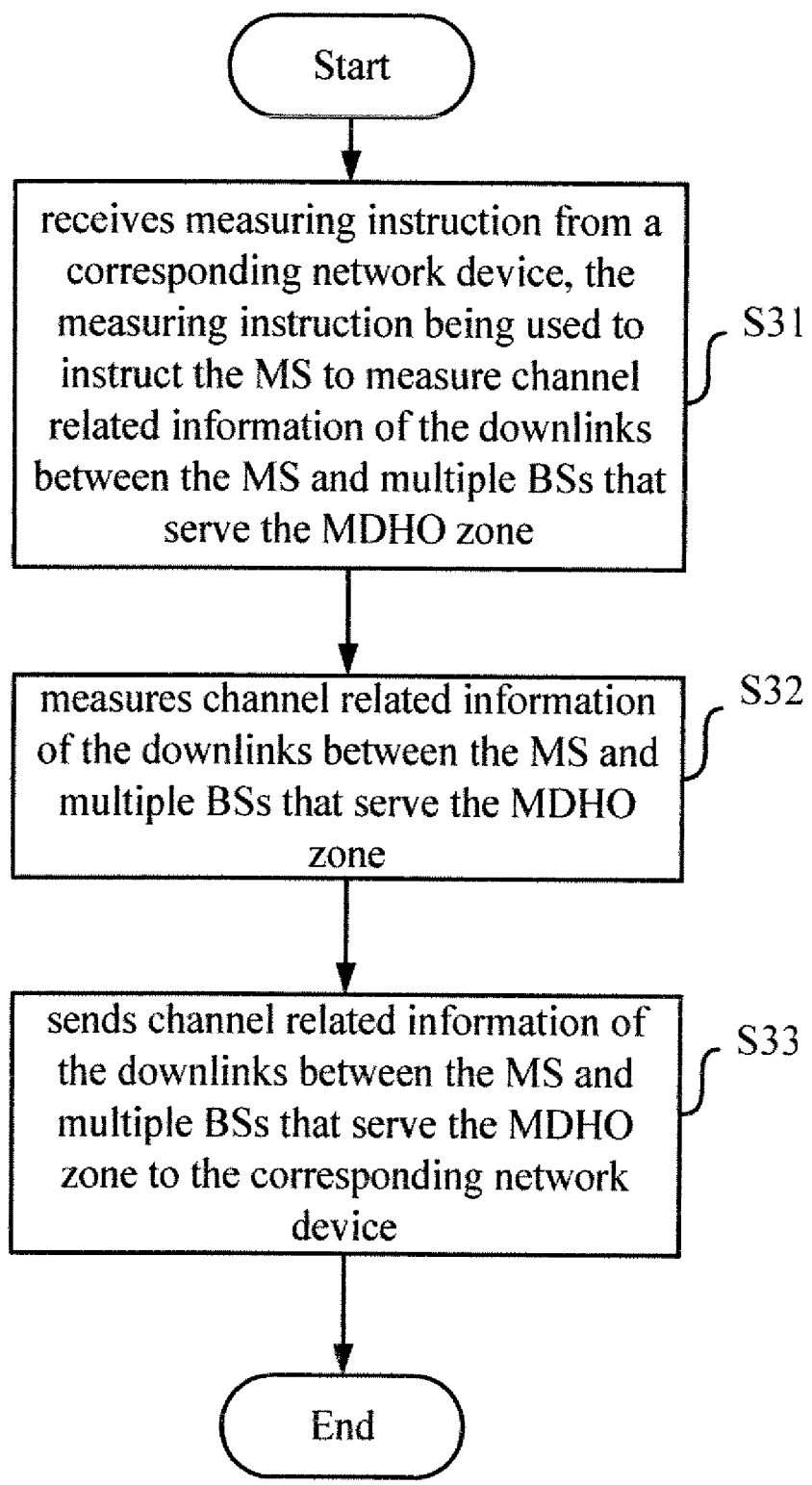
FIG. 6 shows a flowchart, in a mobile station in wireless telecommunication networks, of aiding the cancellation of interference among the received signals of said mobile station and that of other at least one mobile station in a MDHO zone when said mobile station is located in said MDHO zone according to an embodiment of the present invention.

FIG. 6 shows a flowchart, in a mobile station in wireless telecommunication networks, of aiding the cancellation of interference among the received signals of the mobile station and that of other at least one mobile station in a MDHO zone when said mobile station is located in said MDHO zone according to an embodiment of the present invention.

Taking the MS 2 in the application scenario shown in FIG. 1 as an example, and referring to FIG. 6, the flowchart in a MS in the present invention, of aiding the cancellation of the interference among received signals of the MS and other one or multiple mobile stations in the MDHO zone when the mobile station is located in said MDHO zone is given in details.

First, in step S31, the MS 2 receives a measuring instruction from a corresponding network device, and the measuring instruction is used to instruct the mobile station 2 to measure channel related information of the DLs between the mobile station 2 and multiple base stations that serve said MDHO zone, that is, BS 1, BS 1' and BS 1". The corresponding network device includes a controlling device that dominates the MDHO zone or one of multiple base stations that serve the MDHO zone, and the channel related information includes channel estimating values, or channel estimating values and signal to noise ratio.

Then, in step S32, the MS 2 measures channel related information of the downlinks between the mobile station 2 and BS 1, BS 1' and BS 1" respectively.

At last, in step S33, the MS 2 sends channel related information of the downlinks between the MS 2 and BS 1, BS 1' and BS 1" to the corresponding network device.

It should be noted that step S31 is not the necessary step for the MS to implement the method of the present invention. The MS 2 can actively measure the channel related information between itself and the BS 1, BS 1' and BS 1", and report actively to the controlling device; or the MS reports actively to a certain BS, and the certain BS reports to the controlling device. Or the MS 2 reports the channel related information of the DLs between itself and the BS 1, BS 1' and BS 1" to each of BS 1, BS 1' and BS 1", and each BS then reports to the controlling device.

Figure 7:
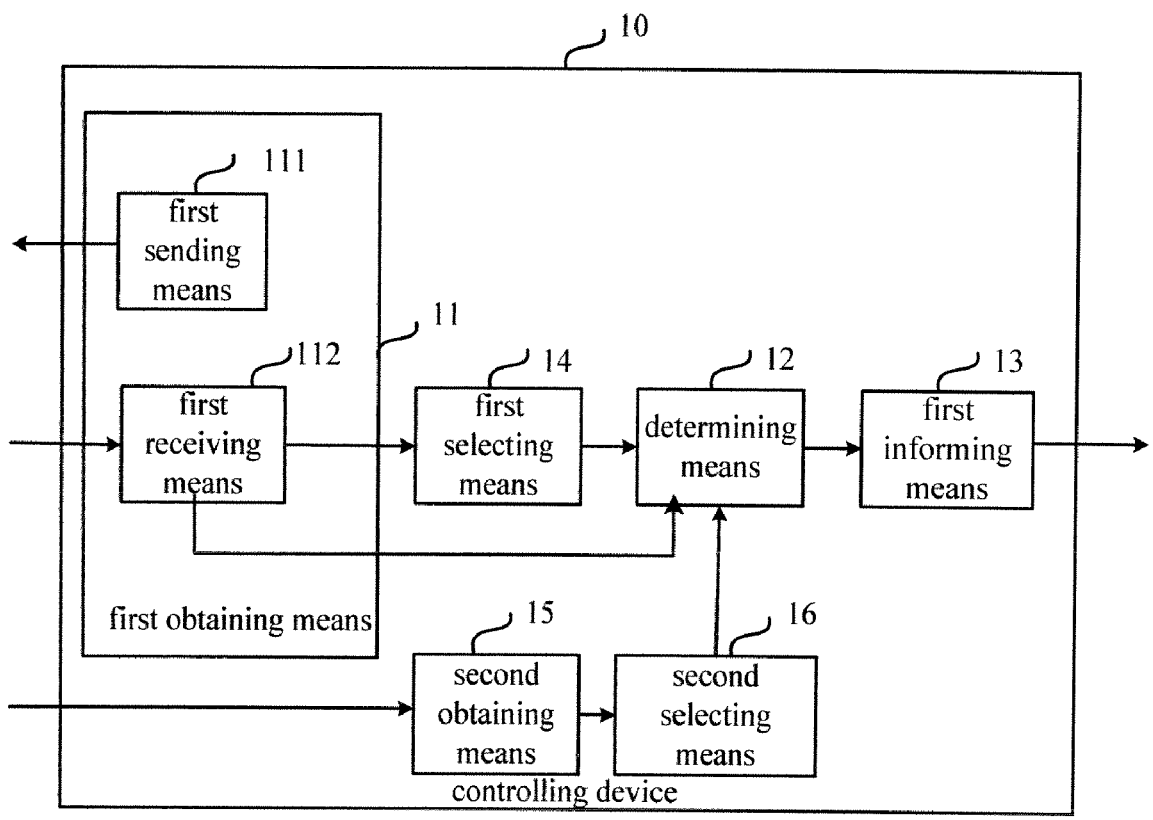
FIG. 7 shows a block diagram of a controlling device 10, in wireless telecommunication network, for controlling the cancellation of the interference among received signals of multiple mobile stations in the MDHO zone dominated by the controlling device according to an embodiment of the present invention.

FIG. 7 shows a block diagram of the controlling device 10, in wireless telecommunication networks, for controlling the cancellation of the interference among received signals of multiple mobile stations in the MDHO zone dominated by the controlling device according to an embodiment of the present invention. The controlling device 10 includes a first obtaining means 11, a determining means 12, a first informing means 13, a first selecting means 14, a second obtaining means 15 and a second selecting means 16, wherein the first obtaining means 11 includes two sub-means: a first sending means 111 and a first receiving means 112. Here for the sake of simplicity, many optional sub-means in preferred embodiments are shown in FIG. 7, those skilled in the art can understand that only the first obtaining means 11, the determining means 12 and the first informing means 13 are essential for implementing the present invention, and other sub-means are all optional.

Taking the application scenario of FIG. 1 as an example, and referring to FIG. 7, the process in the controlling device 10 of the present invention, of controlling the cancellation of the interference among received signals of multiple mobile stations in the MDHO zone dominated by the controlling device 10 is given in details. Here, suppose the controlling device 10 is responsible for controlling each BS that serves the MDHO zone M123, that is, controlling BS 1, BS 1' and BS 1" to jointly send DL signals to MS 2, MS 2' and MS 2".

First, the first obtaining means 11 obtains the channel related information of the DLs between the MS 2, MS 2' and MS 2" and the BS 1, BS 1' and BS 1" in the MDHO zone M123. The channel related information includes the channel estimating values, or channel estimating values and SNR.

To be specific, the ways for the first obtaining means 11 to obtain the channel related information of the DLs between the MS 2, MS 2' and MS 2" and the BS 1, BS 1' and BS 1" are various.

One obtaining way is: the first sending means 111 sends the measuring instruction to MS 2, MS 2' and MS 2" respectively, the measuring instruction is used to instruct each MS to measure the channel related information of the DLs between each MS and multiple BSs and to send the channel related information to the controlling device, and then the first receiving means 112 receives the channel related information of the DLs between MS 2, MS 2' and MS 2" and BS 1, BS 1' and BS 1" respectively from MS 2, MS 2' and MS 2".

Another obtaining way is that: the first obtaining means 11 informs BS 1, BS 1' and BS 1" respectively, and each of BS 1, BS 1' and BS 1" informs each of MS 2, MS 2' and MS 2" of measuring the channel related information and feeding them back to the corresponding BSs, and the BSs send them to the controlling device 10.

Still another obtaining way is: each of the MS 2, MS 2' and MS 2" actively measures the channel related information between each of the MS 2, MS 2' and MS 2' and BS 1, BS 1' and BS 1", and actively report them to the BS 1, BS 1' and BS 1"; each of the BS 1, BS 1' and BS 1" then actively sends them to the controlling device 10.

Besides, for the case of symmetry between the UL and DL channel in Time-Division Duplex (TDD) system, each BS can directly determine the channel estimating values, and send them to the controlling device 10.

Then, the determining means 12 determines the precoding coefficients of BS 1, BS 1' and BS 1" based on the channel related information and a predetermined rule, and the aim of precoding is to cancel the interference among the received signals of MS 2, MS 2' and MS 2".

Referring to the determining method of the precoding coefficients in the existing MU-MIMO, the precoding coefficients can be determined by the determining means 12 based on the channel transmitting matrix of the DL channel between each BS and each MS and the BD rule of the equivalent channel matrix; or determined by the channel transmitting matrix of the DL channel between each BS and each MS and the SNR of the DL signal and the MMSE rule or SMMSE rule.

At last, the first informing means 13 informs each BS of its corresponding precoding coefficients.

Preferably, the first selecting means 14 can select two BSs from the BS 1, BS 1' and BS 1" that serve the MDHO zone M123 to jointly send precoded DL signals to the MS 2, MS 2' and MS 2" over the same time-frequency resources, based on the channel related information.

Preferably, the first selecting means 14, based on the channel related information, can divide the multiple BSs that serve a certain MDHO zone into multiple BS groups and divide the multiple MSs in the MDHO zone into multiple MS groups, wherein, each BS group jointly send DL signals to corresponding one MS group over the same time-frequency resources, each BS group occupies different time-frequency resources.

Besides, the second selecting means 16 can select two BSs from the BS 1, BS 1' and BS 1" that serve the MDHO zone M123 to jointly send precoded DL signals to the MS 2, MS 2' and MS 2" over the same time-frequency resources, based on the signal strengths of the UL signals received by the BS 1, BS 1' and BS 1" that serve the MDHO zone M123 from the MS 2, MS 2' and MS 2". To be specific, the second obtaining means 15 informs the BS 1, BS 1' and BS 1" to detect the signal strengths of the UL signals from the MS 2, MS 2' and MS 2" and report the signal strengths of the UL signals from each MS to the controlling device.

Besides, the second selecting means 16, based on the signal strength of the UL signal received by each BS from each MS, can divide the multiple BSs that serve a certain MDHO zone into multiple BS groups and divide the multiple MSs in the MDHO zone into multiple MS groups, wherein each BS group jointly send DL signals to corresponding one MS group over the same time-frequency resources, each BS group occupies different time-frequency resources.

Preferably, the first informing means 13 informs the BS 1, BS 1' and BS 1" that serve the MDHO zone M123 to send orthogonal pilot symbols at each transmitting antenna to the MS 2, MS 2' and MS 2", in order for the MS 2, MS 2' and MS 2" to determine the channel estimating values conveniently.

It should be noted that, the MS 2, MS 2' and MS 2" can determine the DL channel estimating values based one the non-orthogonal pilot symbols sent by BS 1, BS 1' and BS 1".

Figure 8:
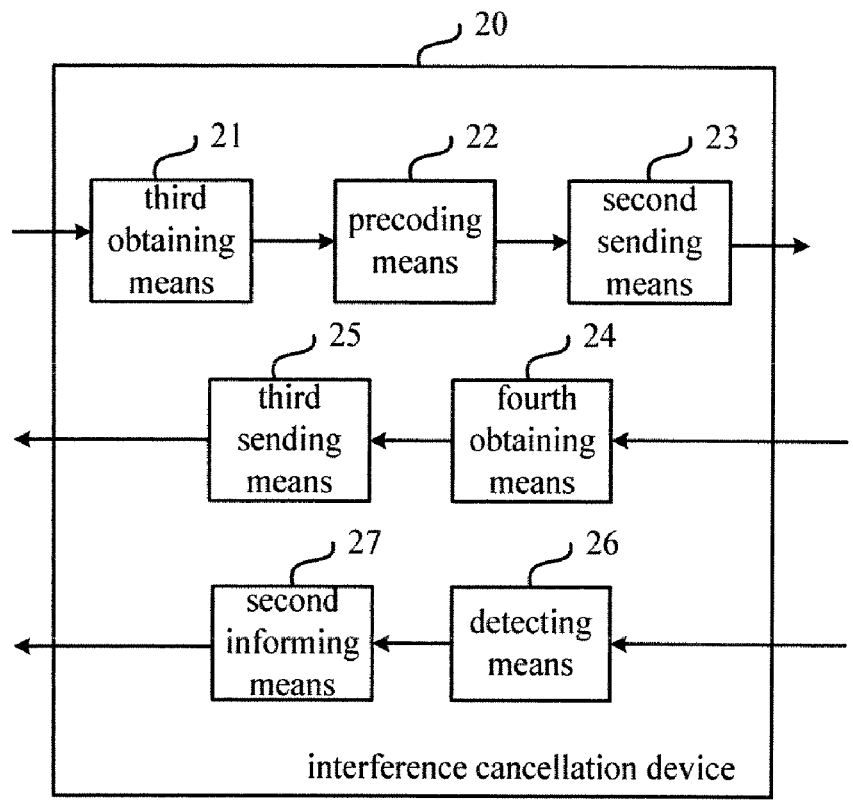
FIG. 8 shows a block diagram of an interference cancellation device 20, in a BS in wireless telecommunication network, for cancelling the interference among received signals of multiple mobile stations in the MDHO zone served by the BS according to an embodiment of the present invention.

FIG. 8 shows a block diagram of the interference cancellation device 20, in a BS in wireless telecommunication network, for cancelling the interference among received signals of multiple mobile stations in the MDHO zone served by the BS according to an embodiment of the present invention. The interference cancellation device 20 includes a third obtaining means 21, a precoding means 22, a second sending means 23, a fourth obtaining means 24, a third sending means 25, a detecting means 26 and a second informing means 27. Here for the sake of simplicity, many optional sub-means in preferred embodiments are shown in FIG. 8, those skilled in the art should understand that only the third obtaining means 21, the precoding means 22 and the second sending means 23 are essential for implementing the present invention, and other sub-means are all optional.

Taking the BS 1 in the application scenario shown in FIG. 1 as an example, and referring to FIG. 8, the process, in an interference cancellation device in the present invention, of canceling the interference among received signals of multiple mobile stations in the MDHO zone served by the BS is given in details.

First, the third obtaining means 21 obtains the precoding coefficients determined by a controlling device 10 dominating said MDHO zone for BS 1.

Then, the precoding means 22 precodes, modulated signals to be sent jointly by BS 1, BS 1' and BS 1" over same time frequency resources to MS 2, MS 2' and MS 2" based on the precoding coefficients, so as to obtain precoded signals to be sent.

At last, the second sending means 23 sends the precoded signals to MS 2, MS 2' and MS 2"

Preferably, the fourth obtaining means 24 can obtain the channel related information between the BS 1 and MS 2, MS 2' and MS 2"; and the third sending means 25 sends the channel related information to the controlling device. To be specific, taking the case that the fourth obtaining means 24 obtains the channel related information of MS 2 as an example. When the fourth obtaining means 24 receives the notification from the controlling device 10 or detects that the signal strength of the UL signal from the MS 2 is lower than a threshold, it informs MS 2 to estimate the channel related information and send it to the fourth obtaining means 24. Then, the third sending means 25 sends the received channel related information of MS 2 to the controlling device 10. Alternatively, the MS 2, MS 2' and MS 2" actively measure the channel related information between themselves and the BS 1, and report actively to the fourth obtaining means 24, and the third sending means 25 sends them actively to the controlling device 10.

Besides, for the case of symmetry between the UL and DL channel in Time-Division Duplex (TDD) system, the fourth obtaining means 24 can directly determine the channel estimating values, and send them to the controlling device 10.

Preferably, the detecting means 26 can detect the signal strengths of the UL signals received by the BS 1 from the MS 2, MS 2' and MS 2" based on the notification of the controlling device 10 or actively; and the second informing means 27 informs the signal strengths of the UL signals from the MS 2, MS 2' and MS 2" to the controlling device 10.

Preferably, the second sending means 23 sends corresponding pilot symbols to the MS 2, MS 2' and MS 2" according to the orthogonal pilot pattern informed by the controlling device 10.

It should be noted that, the MS 2, MS 2' and MS 2" can determine the channel estimating values of the DLs based on the non-orthogonal pilot symbols sent by BS 1, BS 1' and BS 1".

Figure 9:
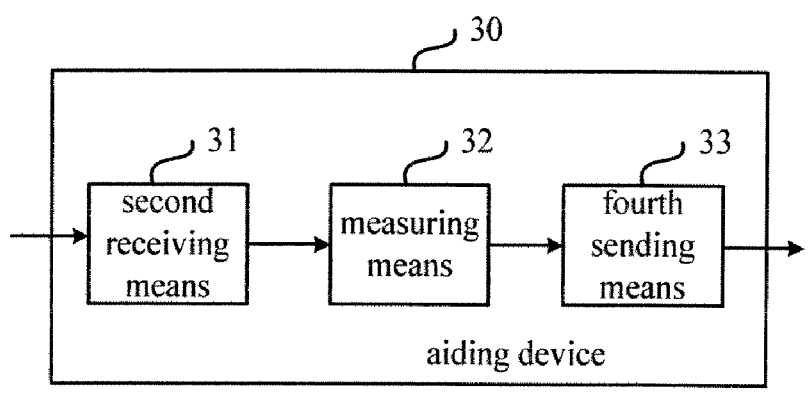
FIG. 9 shows a block diagram of an aiding device 30 in a mobile station, in wireless telecommunication networks, for aiding the cancellation of interference among the received signals of said mobile station and that of other at least one of mobile station in a MDHO zone when the mobile station is located in said MDHO zone according to an embodiment of the present invention.

FIG. 9 shows a block diagram of the aiding device 30 in a mobile station in wireless telecommunication networks, for aiding the cancellation of interference among the received signals of the mobile station and that of other at least one of mobile station in a MDHO zone when the mobile station is located in the MDHO zone according to an embodiment of the present invention. The aiding device 30 includes a second receiving means 31, a measuring means 32 and a fourth sending means 33. Only the measuring means 32 and the fourth sending means 33 are essential for implementing the present invention, and the second receiving means 31 is optional.

Taking the MS 2 in the application scenario shown in FIG. 1 as an example, and referring to FIG. 9, the process, in the aiding device 30 in the present invention, of aiding the cancellation of the interference among received signals of the MS and other one or multiple mobile stations in the MDHO zone when the mobile station is located in said MDHO zone is given in details.

First, the second receiving means 31 receives a measuring instruction from a corresponding network device, and the measuring instruction is used to instruct the mobile station 2 to measure channel related information of the DLs between the mobile station 2 and multiple base stations that serve said MDHO zone, that is, BS 1, BS 1' and BS 1". The corresponding network device includes a controlling device that dominates the MDHO zone or one of multiple base stations that serve the MDHO zone, and the channel related information includes channel estimating values, or channel estimating values and signal to noise ratio.

Then, the measuring means 32 measures channel related information of the downlinks between the mobile station 2 and BS 1, BS 1' and BS 1".

At last, the fourth sending means 33 sends channel related information of the downlinks between the mobile station 2 and BS 1, BS 1' and BS 1" to the corresponding network device.

It should be noted that the second receiving means 31 is not the essential means for the MS 2 to implement the method of the present invention. The measuring means 32 can actively measure the channel related information between itself and the BS 1, BS 1' and BS 1", and the fourth sending means 33 reports actively to the controlling device 10. Alternatively, the fourth sending means 33 reports actively to a certain BS, and the certain BS reports to the controlling device 10. Alternatively, the fourth sending means 33 reports the channel related information of the DLs between the MS 2 and the BS 1, BS 1' and BS 1" to each of BS 1, BS 1' and BS 1", and each BS then reports to the controlling device 10.

Although the WiMax wireless telecommunication network is taken as an example for elucidating the present invention, those skilled in the art can understand that the present invention is not limited to this according to the teaching of the present application document. The present invention is also applicable to other wireless telecommunication network. And the technical solution of the present invention can be implemented by software or hardware.

The embodiments of the present invention have been described above. It is understandable by those skilled in the art that the present invention is not limited to the above specific embodiments, and various modifications or amendments can be made without departing from the scope and spirit of the scope of the attached claims.

What is claimed is:

1. A method, in a controlling device in wireless telecommunication networks, of controlling the cancellation of the interference among received signals of multiple mobile stations in a macro-diversity handover zone dominated by the controlling device, comprising:
   a. obtaining channel related information of the downlinks between multiple mobile stations in said macro-diversity handover zone and multiple base stations that serve said macro-diversity handover zone;
   b. selecting, based on said channel related information, multiple base stations from said multiple base stations that serve said macro-diversity handover zone for jointly sending downlink signals to said multiple mobile stations over same time-frequency resources, and grouping said multiple base stations that serve said macro-diversity handover zone into multiple base station groups and grouping said multiple mobile stations into multiple mobile station groups based on said channel related information, wherein base stations of each group jointly send downlink signals to corresponding one mobile station groups over same time-frequency resources respectively, and said time frequency resources occupied by each base station group is different;
   c. determining precoding coefficients of said multiple base stations based on said channel related information and a predetermined rule, said precoding coefficients configured to be used by said multiple base stations to precode the multi-streams modulated signals to be sent jointly by said multiple base stations to said multiple mobile stations over same time-frequency resources, so as to cancel interference among received signals of said multiple mobile stations, determining precoding coefficients of said selected multiple base stations, based on channel related information between said selected multiple base stations and said multiple mobile stations and said predetermined rule, and determining precoding coefficients of multiple base stations of each group based on said channel related information and said predetermined rule, said precoding coefficients configured to be used by said multiple base stations of said each group to precode the modulated signals to be sent jointly over same time-frequency resources to a corresponding group of multiple mobile stations; and
   d. informing each base station of its corresponding precoding coefficients.

2. The method of claim 1, further comprising the following steps:
   obtaining signal strength indicating information of uplink signals respectively received by said multiple base stations from said multiple mobile stations;
   wherein said method further comprises the following step before said step c:
      b'. selecting, based on said signal strength indicating information, multiple base stations from said multiple base stations that serve said macro-diversity handover zone for jointly sending downlink signals to said multiple mobile stations over same time-frequency resources;
   wherein said step c further comprises:
      determining precoding coefficients of said selected multiple base stations, based on said channel related information between said selected multiple base stations and said multiple mobile stations and said predetermined rule.

3. The method of claim 2;
   wherein said step b' further comprises:

selecting, based on said signal strength indicating information, multiple base stations from said multiple base stations that serve said macro-diversity handover zone for jointly sending downlink signals to multiple of said multiple mobile stations over same time-frequency resources; and wherein said step c further comprises:

determining precoding coefficients of said multiple base stations, based on said channel related information and said predetermined rule, said precoding coefficients configured to be used by said multiple base stations to precode the modulated signals to be sent jointly to multiple of said multiple mobile stations over same time-frequency resources.

4. The method of claim 1, wherein said channel related information includes channel estimating values, said predetermined rule includes a rule of block diagonalization of the equivalent channel matrix; or said channel related information includes channel estimating values and signal to noise ratio, said predetermined rule includes minimum mean-square error rule or successive minimum mean-square error rule.

5. A controlling device, in wireless telecommunication networks, for controlling the cancellation of the interference among received signals of multiple mobile stations in a macro-diversity handover zone dominated by the controlling device, comprising:

a first obtaining component configured to obtain channel related information of downlinks between multiple mobile stations in said macro-diversity handover zone and multiple base stations that serve said macro-diversity handover zone;

a first selecting component operative to select, based on said channel related information, multiple base stations from said multiple base stations that serve said macro-diversity handover zone for jointly sending downlink signals to said multiple mobile stations over same time-frequency resources, and grouping said multiple base stations that serve said macro-diversity handover zone into multiple base station groups and grouping said multiple mobile stations into multiple mobile station groups based on said channel related information, wherein base stations of each group jointly send downlink signals to corresponding one mobile station groups over same time-frequency resources respectively, and said time frequency resources occupied by each base station group is different;

a first determining component configured to determine precoding coefficients of said multiple base stations based on said channel related information and a predetermined rule, said precoding coefficients configured to be used by said multiple base stations to precode the multi-stream modulated signals to be sent jointly by said multiple base stations to said multiple mobile stations over same time-frequency resources, so as to cancel interference among received signals of said multiple mobile stations, said first determining component being further configured to determine precoding coefficients of said selected multiple base stations, based on channel related information between said selected multiple base stations and said multiple mobile stations and said predetermined rule, and determining precoding coefficients of multiple base stations of each group based on said channel related information and said predetermined rule, said precoding coefficients configured to be used by said multiple base stations of said each group to precode the modulated signals to be sent jointly over same time-frequency resources to a corresponding group of multiple mobile stations; and a first informing component configured to inform each of base station of its corresponding precoding coefficients.

6. The controlling device of claim 5, further comprising:

a second obtaining component configured to obtain signal strength indicating information of uplink signals respectively received by said multiple base stations from said multiple mobile stations;

a second selecting component configured to select, based on said signal strength indicating information, multiple base stations from said multiple base stations that serve said macro-diversity handover zone for jointly sending downlink signals to said multiple mobile stations over same time-frequency resources;

wherein said first determining component is further configured to determine precoding coefficients of said selected multiple base stations, based on said channel related information between said selected multiple base stations and said multiple mobile stations and said predetermined rule.

* * * * *